United States Patent
Andersen et al.

(10) Patent No.: US 10,602,003 B2
(45) Date of Patent: Mar. 24, 2020

(54) MULTI-FUNCTION PRINTING (MFP) DEVICE CALIBRATION

(71) Applicant: Hewlett-Packard Development Company, L.P., Houston, TX (US)

(72) Inventors: Eric L Andersen, Boise, ID (US); Kenneth Scott Line, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,502

(22) PCT Filed: Jul. 18, 2016

(86) PCT No.: PCT/US2016/042784
§ 371 (c)(1),
(2) Date: Oct. 29, 2018

(87) PCT Pub. No.: WO2018/017042
PCT Pub. Date: Jan. 25, 2018

(65) Prior Publication Data
US 2019/0158682 A1 May 23, 2019

(51) Int. Cl.
*H04N 1/00* (2006.01)
*G06K 15/02* (2006.01)

(52) U.S. Cl.
CPC ....... *H04N 1/00087* (2013.01); *G06K 15/027* (2013.01); *H04N 1/00015* (2013.01); *H04N 1/00018* (2013.01); *H04N 1/00045* (2013.01); *H04N 1/00063* (2013.01); *H04N 1/00068* (2013.01); *H04N 2201/0006* (2013.01); *H04N 2201/0094* (2013.01)

(58) Field of Classification Search
CPC ........... H04N 1/00087; H04N 1/00015; H04N 1/00018; H04N 1/00045; H04N 1/00063; H04N 1/0068; H04N 2201/006; H04N 2201/0094; G06K 15/027
USPC ........................................................ 358/406
See application file for complete search history.

(56) References Cited

U.S. PATENT DOCUMENTS 5,813,771 A 9/1998 Ur et al.
5,969,371 A 10/1999 Andersen
(Continued)

FOREIGN PATENT DOCUMENTS

WO   WO-0044164 A1   7/2000

OTHER PUBLICATIONS

Splash G620 User Guide, Apr. 17, 2000, http://download.support.xerox.com/—169 pages.

*Primary Examiner* — Allen H Nguyen
(74) *Attorney, Agent, or Firm* — Fabian VanCott

(57) ABSTRACT

A method for calibrating a multi-function printing (MFP) device includes printing a calibration target image on a first side of a print medium from at least one print medium source with a printing device of the MFP device. The calibration target image includes at least one fiducial. The method includes scanning the first side of the print medium comprising the calibration target image with a scanning device of the MFP device to create a first scanned image, identifying at least one edge of the print medium via a background pattern to determine a number of scan measurements, identifying at least one position of the at least one fiducial within the calibration target image, and calculating a calibration target error based on the at least one fiducial and the scan measurements.

18 Claims, 10 Drawing Sheets

(56) References Cited

U.S. PATENT DOCUMENTS

| | | |
|---|---|---|
| 6,778,925 B2 | 8/2004 | Andersen |
| 6,813,573 B2 | 11/2004 | Andersen |
| 7,097,269 B2 | 8/2006 | Collette et al. |
| 7,522,306 B2 | 4/2009 | Andersen |
| 7,650,093 B2 | 1/2010 | Suzuki |
| 8,724,925 B2 | 5/2014 | Hasegawa et al. |
| 9,298,148 B2 | 3/2016 | Wakai |
| 2002/0165685 A1 | 11/2002 | Anderson et al. |
| 2005/0175386 A1* | 8/2005 | Romine ............... B41J 11/0055 400/579 |
| 2005/0286922 A1* | 12/2005 | Oki ..................... H04N 1/0058 399/75 |
| 2007/0030525 A1* | 2/2007 | Ono ..................... H04N 1/6033 358/406 |
| 2007/0291291 A1* | 12/2007 | Vilar .................... H04N 1/3878 358/1.9 |
| 2011/0194131 A1 | 8/2011 | Hunter et al. |
| 2011/0304886 A1* | 12/2011 | Hoover .................... B41J 3/60 358/1.18 |
| 2012/0081426 A1* | 4/2012 | Rossell .................... B41J 3/60 347/9 |
| 2012/0081736 A1* | 4/2012 | Pinney .................. G06F 3/1205 358/1.15 |
| 2016/0156810 A1* | 6/2016 | Nakamura ......... H04N 1/00015 358/1.9 |

\* cited by examiner

MULTI-FUNCTION PRINTING (MFP) DEVICE CALIBRATION

BACKGROUND

Multi-function printing (MFP) devices provide a plurality of functions in addition to printing including, for example, document scanning through scanning devices, document photocopying through photocopying devices, document faxing through faxing devices, and electronic mails services through email devices, among many other functionalities and associated devices. The conglomeration of multiple functionalities in one device provides for a smaller footprint in a home or small business setting, and provides centralized document management, distribution, and production in a large-office setting.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
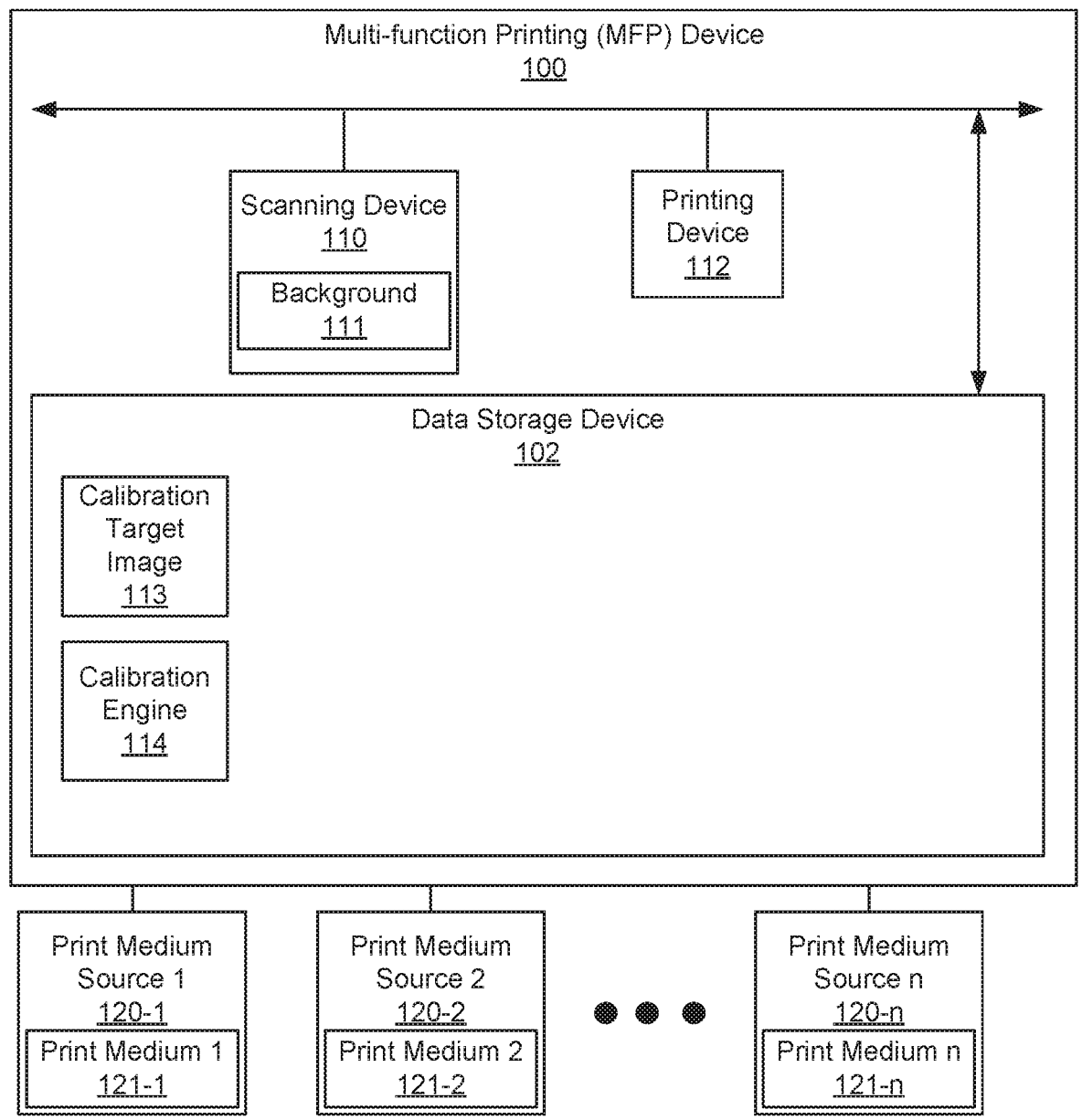
FIG. 1 is a block diagram of a multi-function printing (MFP) device, according to one example of the principles described herein.

MFP devices may include a plurality of print medium sources from which print media of various types and sizes are obtained by various media conveyance devices such as pick mechanisms and rollers. During a print job, the printing device of the MFP prints images and text onto the print medium as conveyed from the print medium sources. Each print medium source such as medium trays and high capacity medium trays may retain the print medium therein in a number of different orientations and positions before it gets moved from the print medium source to the printer engine imaging section where the text and images are printed on the media. However, due to wear on the various media conveyance devices throughout the life of the MFP, and due to the varied orientation and positioning of the print media within their respective print medium sources, skewing, misalignment, and mis-positioning of print media with respect to the printer engine imaging section may occur. Further, skewing, misalignment, and mis-positioning of print media with respect to the printer engine imaging section may occur differently for each of the print medium sources. This may result in a printed medium obtained from the printing device that includes noticeably flawed and unsatisfactory printed media. This, in turn, may result in user dissatisfaction with the quality of the MFP and its various functionality. Thus, calibration of each of the print medium sources individually with respect to the printer engine imaging section may be performed to alleviate or eliminate flawed and unsatisfactory printed medium.

Along with calibration of the printing device of the MFP, calibration of a scanning device of the MFP may also be performed to correct the manner in which an automatic document feeder (ADF) conveys a printed document across a scanning device by scanning a printed calibration target image via the ADF and correcting the placement of the scanned document within the electronic image obtained from the scanning device. Similarly, the document may be scanned using a glass platen of the scanning device where the user places the printed calibration target image on the glass platen in a designated orientation and position, and the calibration corrects the placement of the scanned document within the electronic image obtained from the scanning device.

Examples described herein provide a method of calibrating a multi-function printing (MFP) device includes printing a calibration target image on a first side of a print medium from at least one print medium source with a printing device of the MFP device, the calibration target image including at least one fiducial, and scanning the first side of the print medium including the calibration target image with a scanning device of the MFP device to create a first scanned image. The method may also include identifying at least one edge of the print medium via a background pattern to determine a number of scan measurements, and identifying at least one position of the at least one fiducial within the calibration target image. The method also includes calculating a calibration target error based on the at least one fiducial and the scan measurements.

The method further includes storing the calibration target error in a memory device. The calibration target error is stored in a memory device with identification corresponding to at least one print medium source. In one example, the calibration target image is generated by the MFP device from a stored file in a memory device of the MFP device. The method may further include scanning a second side of the print medium opposite the first side of the print medium with the scanning device to create a second scanned image, and, based on the stored identified print media source and calibration target error, identifying a number of scan position errors and calibration correction values for the scanned second side. The scan position errors and the calibration correction values for the scanned second side are stored in the memory device.

Printing the calibration target image includes requesting a user to calibrate the MFP device, and; in response to the user's selection of a number of calibration parameters, printing the calibration target image based on the calibration parameters. The calibration parameters include instructions to calibrate the printing device of the MFP device; instructions to calibrate the scanning device of the MFP device; instructions to use the at least one print medium source as a source of the print medium, or combinations thereof. The calibration target image includes calibration target image information. The calibration target image information includes an orientation indicator to indicate orientation of the print medium including the calibration target image within the scanning device; identification of the at least one print medium source; a number of dimensions of the print medium; an identification of the calibration target image associated with the dimensions of the print medium; identification of the MFP device; a serial number of the MFP device; a date on which the calibration target image is printed on the print medium; a time at which the calibration target image is printed on the print medium, or combinations thereof. In one example, the calibration target image information is defined using a barcode.

The background pattern includes a repeating series of alternating darker tones and lighter tones perpendicular to a scan direction of the scanning device. The at least one print medium source includes a plurality of print medium sources including a plurality of different print medium, and the calibration target error is calculated for each of the different print medium within the plurality of print medium sources, respectively.

Examples described herein provide a multi-function printing (MFP) device. The MFP device includes a scanning device, a background for the scanning device including a repeating series of alternating darker tones and lighter tones perpendicular to a scan direction of the scanning device, and a memory device including a calibration target image stored thereon. The MFP device also includes a printing device to print the calibration target image on a plurality of print media from a corresponding number of print medium sources, and a calibration engine. The calibration engine, for each of the plurality of print media, identifies a leading edge and a number of side edge of the print medium identified using the background to determine a number of scan measurements, calculates a calibration target error based on a number of fiducials within the calibration target image and the scan measurements, and store the calibration target error in the memory device, the calibration target error being associated in the memory device with an identification of the corresponding print medium source.

The scanning device includes an automatic document feeder (ADF), a flatbed platen, or combinations thereof. The memory stores correlation data associating the number of print medium sources with a number of dimensions of the plurality of print media within the print medium sources, respectively. In one example, the ADF may provide for duplex scanning either by inviting a user to mechanically turn the scanned page over and scanning the second side of the document. In another example, duplex scanning may be achieved through use of a second scan head in the ADF paper path that scans the second side of the document fed into the ADF. In still another example, duplex scanning may be achieved through use of a mechanical duplex ADF where the document is subjected to three passes due to flipping of the media by the ADF from a first side to a second side to scan the second side, and performing one last flip in a similar manner to correct the order of the documents as output in an output tray of the ADF.

Examples described herein provide a computer program product for calibrating a multi-function printing (MFP) device. The computer program product includes a computer readable storage medium including computer usable program code embodied therewith. The computer usable program code, when executed by a processor, prints a calibration target image on a first side of a print medium from at least one print medium source with a printing device of the MFP device. The calibration target image includes at least one fiducial. The computer usable program code scans a first side of the print medium including the calibration target image with a scanning device of the MFP device to create a first scanned image, identifies a leading edge and a number of side edges of the print medium via a background pattern to determine a number of scan measurements, and identifies at least one position of the at least one fiducial within the calibration target image. The computer usable program code also calculates a calibration target error based on the at least one fiducial and the scan measurements, and stories the calibration target error in a memory device, the calibration target error being associated in the memory device with an identification of a corresponding one of the at least one print medium source.

The computer usable program code may also scan a second side of the print medium opposite the first side of the print medium with the scanning device to create a second scanned image, and, based on the stored identified print media source and calibration target error, identify a number of scan position errors and calibration correction values for the scanned second side. The computer usable program code stores the scan position errors and the calibration correction values for the scanned second side in the memory device, and prints a number of documents based on the calibration correction values to correct placement of printed images on the print medium. The background pattern includes a repeating series of alternating darker tones and lighter tones perpendicular to a scan direction of the scanning device.

The calibration target image is generated by the MFP device from a stored file in a memory device of the MFP device. The calibration target image includes calibration target image information, the calibration target image information including a barcode defining: an orientation indicator to indicate orientation of the print medium including the calibration target image within the scanning device; identification of the at least one print medium source; identification of the MFP device; a serial number of the MFP device; a date on which the calibration target image is printed on the print medium; a time at which the calibration target image is printed on the print medium, or combinations thereof.

As used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a multi-function printing (MFP) device (100), according to one example of the principles described herein. The MFP device (100) includes a scanning device (110) and a background (111) for the scanning device. In one example, the background (111) includes a repeating series of alternating darker tones and lighter tones perpendicular to a scan direction of the scanning device (100).

The MFP device (100) may include a memory device that includes a calibration target image (113) stored thereon. A printing device (112) may also be included to print the calibration target image (113) on a plurality of print media (121-1, 121-2, 121-*n*) from a corresponding number of print medium sources (120-1, 120-2, 120-*n*).

The MFP device (100) may include a calibration engine (114) to, for each of the plurality of print media (121-1, 121-2, 121-*n*) identify a leading edge and a number of side edges of the print media (121-1, 121-2, 121-*n*) identified using the background (111) to determine a number of scan measurements, and calculate a calibration target error based on a number of fiducials within the calibration target image (113) and the scan measurements. The calibration engine (114) stores the calibration target error in the memory device (102). The calibration target error is associated in the memory device (102) with an identification of the corresponding print medium source (120-1, 120-2, 120-*n*).

Figure 2:
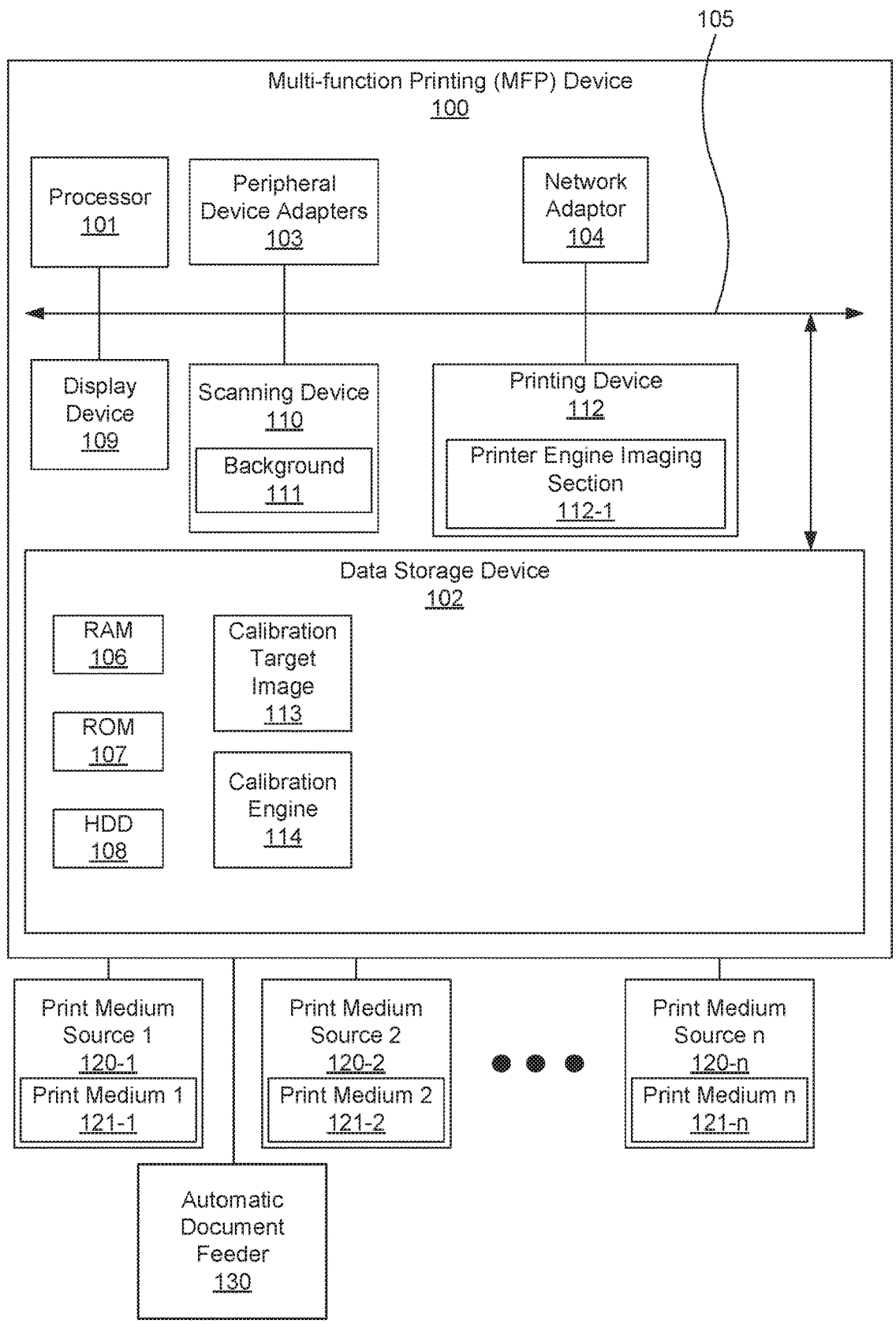
FIG. 2 is a block diagram of a MFP device, according to another example of the principles described herein.

More details in connection with the MFP device (100) will now be provided in connection with FIG. 2. FIG. 2 is a block diagram of the MFP device (100), according to another example of the principles described herein. The MFP (100) may be utilized in any data processing scenario including, standalone hardware, mobile applications, through a computing network, or combinations thereof. Further, the MFP (100) may be used in a computing network, a public cloud network, a private cloud network, a hybrid cloud network, other forms of networks, or combinations thereof.

To achieve its desired functionality, the MFP (100) includes various hardware components. Among these hardware components may be a number of processors (101), a number of data storage devices (102), a number of peripheral device adapters (103), and a number of network adapters (104). These hardware components may be interconnected through the use of a number of busses and/or network connections. In one example, the processor (101), data storage device (102), peripheral device adapters (103), and a network adapter (104) may be communicatively coupled via a bus (105) along with other components and subcomponents described herein.

The processor (101) may include the hardware architecture to retrieve executable code from the data storage device (102) and execute the executable code. The executable code may, when executed by the processor (101), cause the processor (101) to implement at least the functionality of printing a calibration target image (113) on at least one print medium (121-1, 121-2, 121-*n*) from a corresponding number of print medium sources (120-1, 120-2, 120-*n*), scan a number of sides of the print medium (121-1, 121-2, 121-*n*), identify a number of edges of a scanned print medium (121-1, 121-2, 121-*n*), identify the position of a number of fiducials of the calibration target image (113), calculate calibration target errors, store the calibration target errors in the data storage device (102) in association with the identification of a corresponding print medium source (120-1, 120-2, 120-*n*), identify and store scan position errors, print documents based on the calibration correction values to correct placement of images on the print media (121-1, 121-2, 121-*n*), scan documents based on the calibration correction values to ensure that the scanned document is properly oriented and positioned in the electronic scanned copy, and perform other functions according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

Generally, the data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the MFP (100) enable the processor (101) to interface with various other hardware elements, external and internal to the MFP (100). For example, the peripheral device adapters (103) may provide an interface to input/output devices, such as, for example, a display device (109), a mouse, or a keyboard. The peripheral device adapters (103) may also provide access to other external devices such as an external storage device, a number of network devices such as, for example, servers, switches, and routers, client devices, other types of computing devices, and combinations thereof.

The display device (109) may be provided to allow a user of the MFP (100) to interact with and implement the functionality of the MFP (100). The peripheral device adapters (103) may also create an interface between the processor (101) and the display device (109), the scanning device (110), the printing device (112), an emailing device, a faxing device, or other media output devices. The network adapter (104) may provide an interface to other computing devices within, for example, a network, thereby enabling the transmission of data between the MFP (100) and other devices located within the network.

The MFP (100) may, when executed by the processor (101), display the number of graphical user interfaces (GUIs) on the display device (109) associated with the executable program code representing the number of applications stored on the data storage device (102). The GUIs may include aspects of the executable code including displaying a number of selectable parameters associated with the calibration of the various elements of the MFP device (100), prompts to a user to take a number of actions, and instructions to the user, among other actionable and informational aspects of the methods described herein. Additionally, via making a number of interactive gestures on the GUIs of the display device (109), a user may obtain calibration of the printing device (112), the scanning device (110), and (120-1, 120-2, 120-n) of the MFP device (100). A number of input devices such as buttons, switches or a touch screen may be associated with the display device (109) in order to provide the user with a way to interact with the display device (109) and information provided via the display device (109). Examples of information displayed on the display device (109), will be described in more detail below.

As mentioned above, the MFP device (100) includes a number of components or sub-components that provide a plurality of functions including a scanning device (110) to scan documents and create images of the documents in electronic form. Image-capturing peripherals such as the scanning device (110) are useful for capturing and storing images such as text, graphics, or pictorial images included on hardcopies of documents. Various types of scanners include flatbed scanners that include a platen surface of flat glass on which a user of the scanning device (110) places the hardcopy document. A scanning head or sensor moves underneath the document to capture the image contained on the document. The image in digital form can then be transmitted to a data processing device, a data storage device, or both.

To scan a relatively larger quantity of documents other than on a glass platen surface scanning device, an automatic document feeder (ADF) (130) may be combined with the scanning device (110). Each document may be moved past a stationary scanning head, which scans the images on the document as it passes over the scanning head. In another example, the document may be placed on the scanning bed, where the scanning head moves relative to the document as described above. To feed a document or documents for scanning with the ADF, a user places the document into a tray having a pair of side guides for centering the document, although a single side alignment with a fixed edge may also be used in the tray. Whatever configuration of scanning device (110) is used, the scanning device (110) is used to obtain an electronic image of a printed calibration target image in order to assist in the calibration of the image placement on the print media by the printing device (112), the calibration of the scanning device (110), and the calibration of each of the print medium sources (120-1, 120-2, 120-n).

Another component or sub-component of the MPF device (100) may include a printing device (112). The printing device may be any type of device that forms images and text on print media. In one example, the printing device (112) is an inkjet printing device where recreation of a digital image is achieved by propelling droplets of ink onto the print media. In another example, the printing device (112) is a laser printing device where recreation of a digital image is achieved by passing a laser beam back and forth over a negatively charged cylinder called an organic photo conductor (OPC) to define a differentially charged image, collecting electrically charged powder toner on the OPC, and transferring the image created by the toner on the OPC to the print media. However, the printing device (112) may be any type of printing device including, for example, thermal printers, dye-sublimation printers, solid ink printer, photocopying devices, and dot-matrix printers, among other types of printing devices (112). As will be described in more detail below, the printing device (112) is used to create a printed calibration target image from an electronic calibration target image stored in the data storage device (102) in order to assist in the calibration of the image placement on the print media by the printing device (112), the calibration of the scanning device (110), and the calibration of each of the print medium sources (120-1, 120-2, 120-n).

Another component or sub-component of the MPF device (100) may include at least one print medium source (120-1, 120-2, 120-n). The print medium sources (120-1, 120-2, 120-n) may each contain print media of varying sizes and orientation. For example, print medium source (120-1) may include, for example, A4 or letter-sized print media (121-1) with a short edge feed orientation, print medium source (120-2) may include A3, 11 by 17 or ledger-sized print media (121-2) with a short edge feed orientation, and print media source (120-n) may be a high capacity print medium source that includes A4 or letter-sized print media (121-1) with a long edge feed orientation, the "n" in designations 120-n and 121-n indicate that any number of print medium sources (120-1, 120-2, 120-n) and associated print media (211-1, 121-2, 121-n) may be included in the MFP device (100). Further, any type, size and orientation of print media (211-1, 121-2, 121-n) and their respective print medium sources (120-1, 120-2, 120-n) may be included in the MFP device (100). In this manner, the MFP device (100) may provide a wide range of printing services. However, as mentioned above, each of the print medium sources (120-1, 120-2, 120-n) and associated print media (211-1, 121-2, 121-n) may be differently skewed, misaligned, and mis-positioned relative to a printer engine imaging section (112-1) of the printing device (112). Thus, examples described herein provide for the calibration of the print medium sources (120-1, 120-2, 120-n) and associated print media (211-1, 121-2, 121-n) to account for the skewing, misaligning, and mis-positioning of the print media (211-1, 121-2, 121-n) as the print media (211-1, 121-2, 121-n) is transferred from the print medium sources (120-1, 120-2, 120-n) to the printer engine imaging section (112-1) of the printing device (112).

In one example, the calibration target image (113) is stored in the data storage device (102). The storage of the calibration target image (113) in the data storage device (102) provides an untrained, lay user to easily access the calibration target image (113) and create a printed calibration target image therefrom for use in calibration of the various components and subcomponents of the MFP device (100). This significantly reduces costs associated with the calibration process by eliminating costs associated with hiring or contracting with a professional MFP device (100) service repair entity. Paying for an MFP device (100) servicing is costly and causes significant MFP device (100) downtime. The ability to print the calibration target image (113) further reduces costs associated with expensive, pre-printed target images. Printing the calibration target image (113) allows for the user or owner, instead of a repair service, to more effectively and quickly calibrate the MFP device (100) without the use of expensive target images. Further, printing of the calibration target image (113) eliminates the use of manual methods where a service professional uses a ruler and other devices to measure a level of miscalibration of an expensive, precision-printed calibration target image with respect to the MFP device (100).

Further, printing the calibration target image (113) using the same media the printing device regularly uses provides for a more precise calibration since the print media used to calibrate the MFP device (100) has the same properties and will feed within the MFP device (100) in a very similar way as the media that is used in regular printing and scanning operations. Pre-printed target images, in contrast, may be made of different materials and may have different thicknesses and other properties that will change the manner in which the pre-printed target images feed through the MFP device (100). Use of the pre-printed target images will result in a calibration that is not true to the real world use of the MFP device (100) resulting in a less accurate calibration.

The MFP (100) further includes a number of engines used in the implementation of the calibration of the various elements of the MFP device (100). The various modules within the MFP (100) include executable program code that may be executed separately. In this example, the various modules may be stored as separate computer program products. In another example, the various modules within the MFP (100) may be combined within a number of computer program products; each computer program product including a number of the modules. For example, the MFP (100) may include a calibration engine (114) to, when executed by the processor (101), perform the calibration processes described herein. More regarding the calibration process will be described below.

Figure 3:
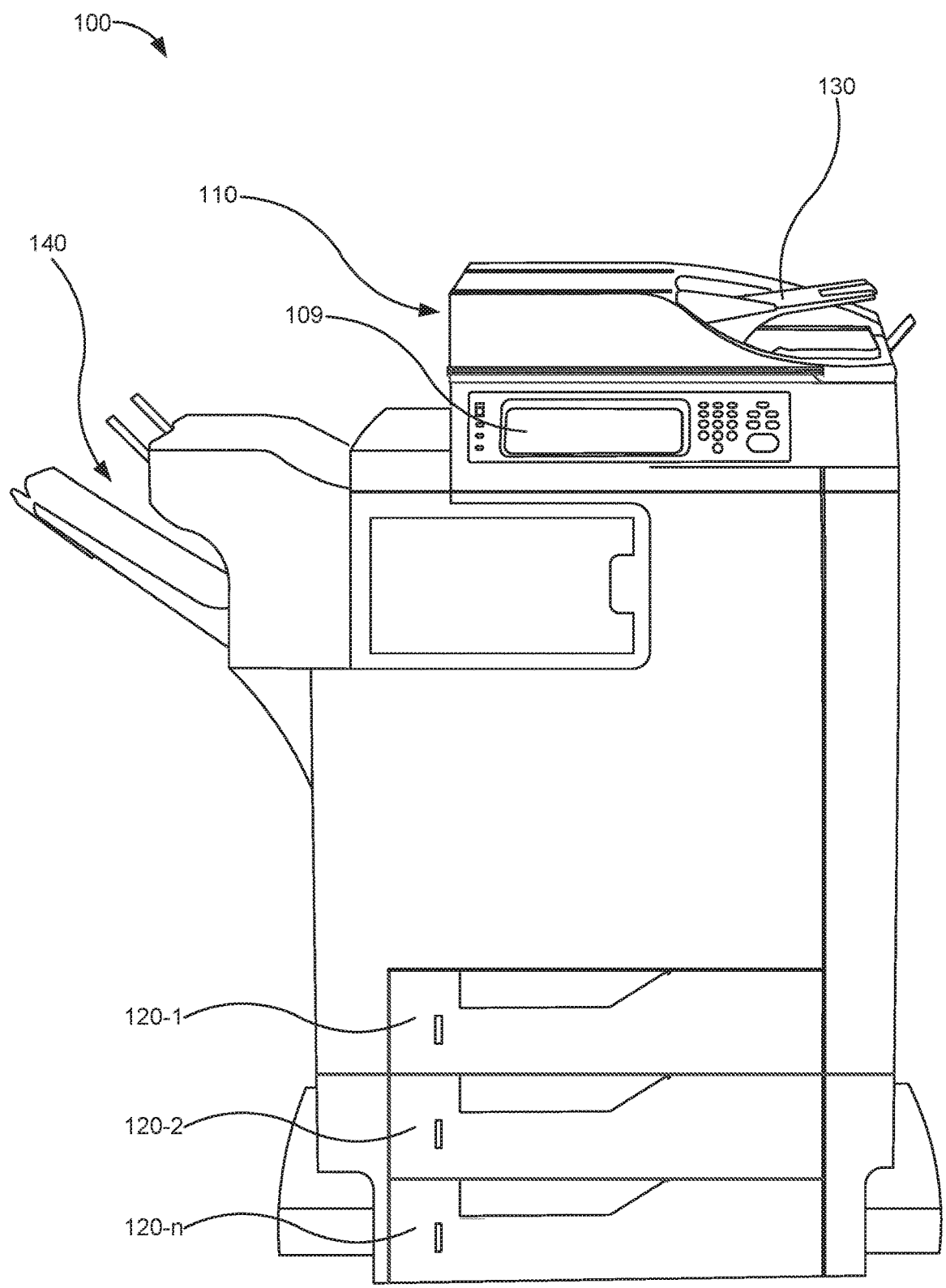
FIG. 3 is a diagram of a MFP device, according to one example of the principles described herein.
Figure 4:
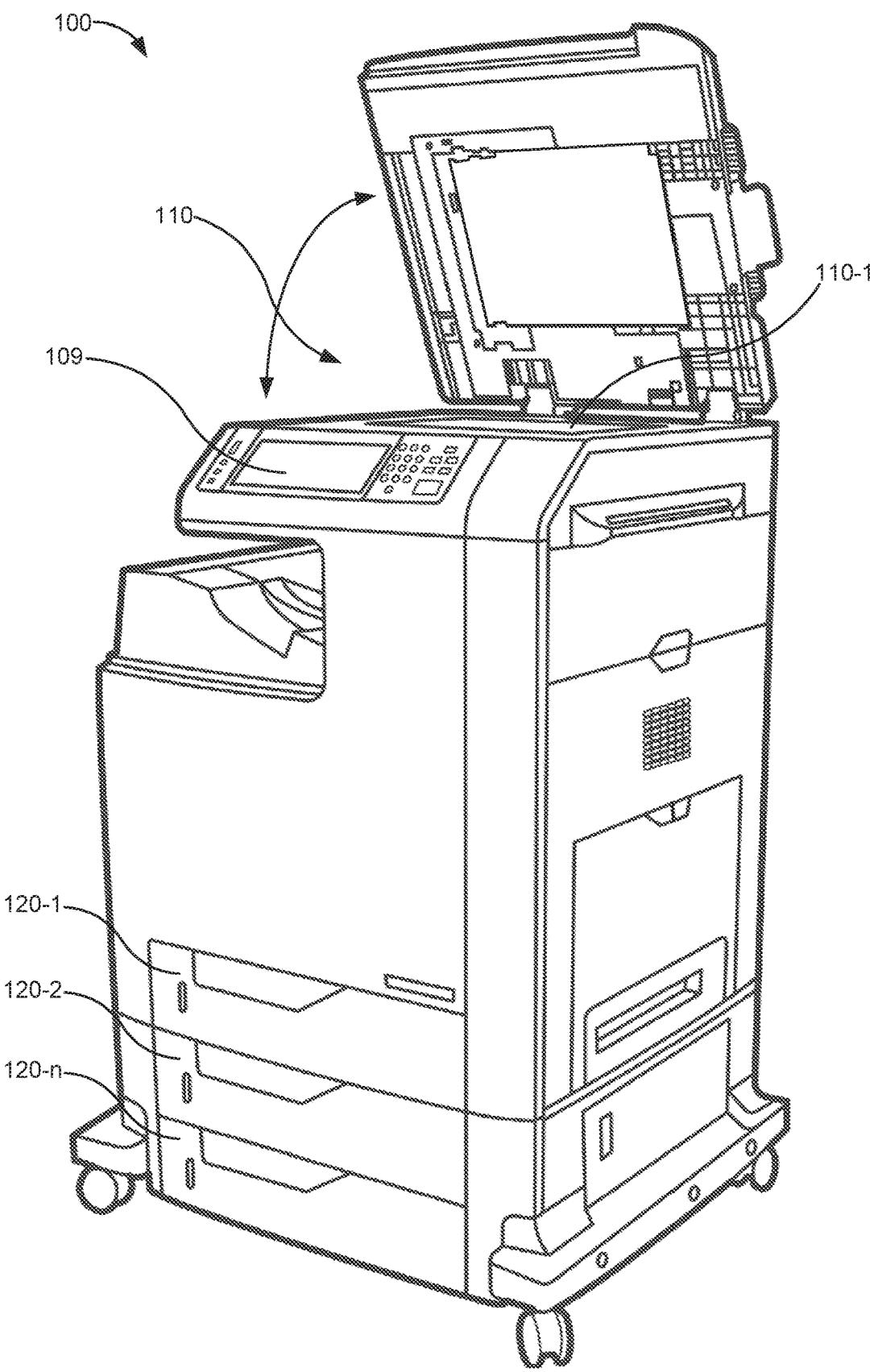
FIG. 4 is a diagram of the MFP device of FIG. 3, according to one example of the principles described herein.

With reference now to FIGS. 3 and 4, FIG. 3 is a diagram of a MFP device (100), according to one example of the principles described herein. FIG. 4 is a diagram of the MFP device (100) of FIG. 3, according to one example of the principles described herein. The diagrams of FIGS. 3 and 4 provide an example of how an MFP device (100) may be arranged. Although a MFP device (100) is depicted in FIGS. 3 and 4, the present methods may be used to calibrate a number of other types of devices including, for example, a standalone scanning device that includes an ADF (130), a glass platen surface (FIG. 4, 110-1), or both, a digital sending device, a network scanning device, and other types of scanning devices that are separate from a MFP device (100). In these examples, the calibration of the standalone scanning devices is accomplished as described herein.

In the example of FIGS. 3 and 4, the MFP device (100) includes the scanning device (110) and its associated glass platen surface (FIG. 4, 110-1) and ADF (130). In this example, the glass platen surface (FIG. 4, 110-1) of the scanning device (110) is exposed by lifting and turning a portion of the scanning device (110) about a number of hinges. This allows a user to obtain access to the glass platen surface (FIG. 4, 110-1). Once the use places a print medium such as a document onto the glass platen surface (FIG. 4, 110-1), a scanning head of the scanning device (110) moves underneath the print medium to capture an image of the print medium. The glass platen surface (FIG. 4, 110-1) of the scanning device (110) is capable of scanning one sheet of a print medium at a time to create an electronic document including an image of the one sheet. This may be performed any number of times to obtain a number of separate or consecutive images of the individually placed sheets of print medium.

In FIG. 3, however, the ADF (130) is utilized by the scanning device (110) when the liftable portion of the scanning device (110) is closed or dropped down. The ADF (130) is used to scan a plurality of sheets of print medium at a time to create an electronic document including images of the plurality of sheets in consecutive order, for example. Each print medium may be moved past the stationary scanning head, which scans the images on the documents as the documents pass over the scanning head. The ADF (130) has an input tray and an output tray used to collect and dispense the print media as they are fed through the ADF (130).

The printing device (120) also includes an output tray (140) to provide a location from which a user may obtain printed sheets of print media. In printing on the print media (121-1, 121-2, 121-n), the MFP (100) pulls the print media (121-1, 121-2, 121-n) from the print medium sources (120-1, 120-2, 120-n) into the printer engine imaging section (112-1) of the printing device (112), prints an image on the print media (121-1, 121-2, 121-n), and outputs the printed media to the output tray (140).

Figure 5:
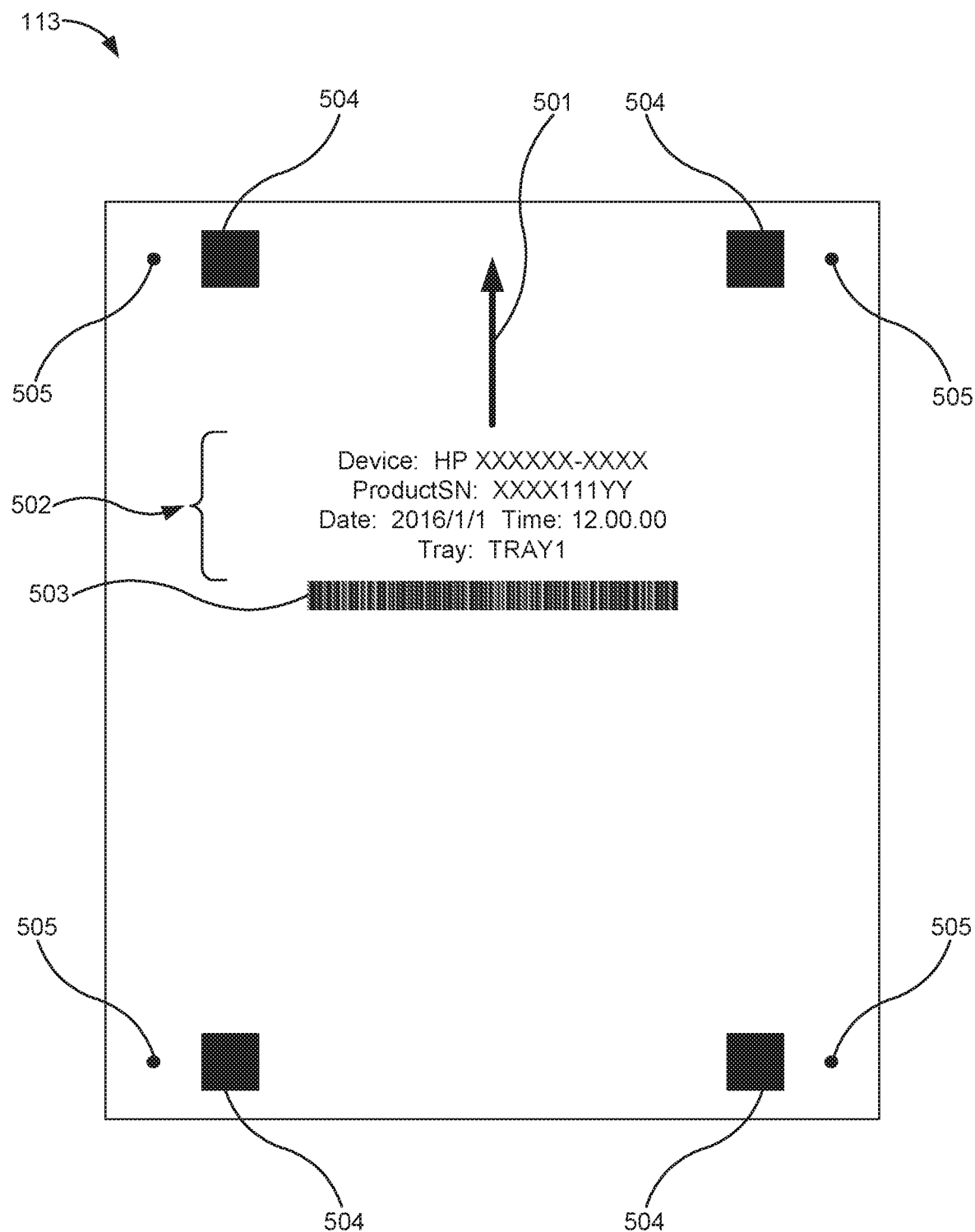
FIG. 5 is a diagram of a calibration target image in a data storage device, according to one example of the principles described herein.

FIG. 5 is a diagram of a calibration target image (113) as stored in a data storage device (102) of the MFP device (100), according to one example of the principles described herein. The calibration target image (113) includes an orientation arrow (501). The orientation arrow (501), when printed, assists a user in determine a correct orientation of a print medium with the calibration target image (113) printed thereon within the scanning device (110) when performing a calibration process. Instructions presented on the display device (109) of the MFP device (100) may be used in connection with the orientation arrow (501) to instruct the user how to orient the print medium with the calibration target image (113) printed thereon within the scanning device (110).

The calibration target image (113) may also include textual information (502). The textual information (502) may include any information associated with the MFP device (100), any of its components or subcomponents, an identification of the MFP device (100), a serial number of the MFP device (100), and model number of the MFP device (100), a date and/or time the calibration target image (113) was printed by the MFP device (100), an identification of the print medium source (120-1, 120-2, 120-n) from which the print media (121-1, 121-2, 121-n) on which the calibration target image (113) is printed thereon originates, other useful information, or combinations thereof.

A barcode (503) may also be included within the calibration target image (113) that provides an optical machine-readable representation of the textual information (502), and data relating to the print medium on which the barcode (503) is printed. Once scanned, the printed calibration target image (113) may be analyzed by the calibration engine (114) to identify the barcode (503) and determine the information represented by the barcode (503). In another example, the scanning head of the scanning device (110) may detect the barcode (503) and determine the information represented by the barcode (503).

A number of fiducials (504, 505) may also be included in the calibration target image (113). The fiducials are used to correct image placement errors that may occur during the transportation of the print media from the print medium sources (120-1, 120-2, 120-n) to the printer engine imaging section (112-1) of the printing device (112) and the resulting skewed, misaligned, and/or mis-positioned image printed on the print media (211-1, 121-2, 121-n). Because print image placement may be different with respect to the each of the print medium sources (120-1, 120-2, 120-n), a calibration target image (113) may be printed on print media (211-1, 121-2, 121-n) from each of the print medium sources (120-1, 120-2, 120-n). The two different types of fiducials (504, 505) depicted in FIG. 5 are rectangular-shaped fiducials (504) and circular-shaped fiducials (505). Although two types of fiducials (504, 505) are depicted in FIG. 5, fewer or more than the two types of fiducials (504, 505) may be included as part of the calibration target image (113). Further, different types of fiducials (504, 505) other than those depicted may be included in the calibration target image (113).

In one example, the fiducials (504) may have a rectangular shape. During analyzation of this first type of fiducial (504), the calibration engine (114) may detect a change from white to black and black to white when finding the edges of the fiducial (504). This may be performed in both the horizontal and vertical directions to identify a center of the fiducial (504). Once the center of the fiducial is identified, the distance of the center from a number of edges of the print media (211-1, 121-2, 121-$n$) may indicate a skewness, misalignment, and/or mis-positioning of the calibration target image (113) printed on the print media (211-1, 121-2, 121-$n$), and may be identified as calibration target errors. The calibration target errors are then stored in the data storage device (102) and used in subsequent printings to adjust the positioning of printed text and images on the print media (211-1, 121-2, 121-$n$) with respect to the respective print medium sources (120-1, 120-2, 120-$n$).

In another example, the fiducials (505) may have a circular shape. During analyzation of this second type of fiducial (505), the calibration engine (114) may detect a centroid of the fiducials (505) within the printed and scanned image of the calibration target image (113) to determine the location of the fiducial (505). With respect to the fiducials (504, 505), once their locations have been determined, the calibration target errors may be determined and stored for later calibration and use during normal printing operations. More regarding the use of calibration target errors in calibration of the printing device (112) will be described in more detail below.

Figure 6:
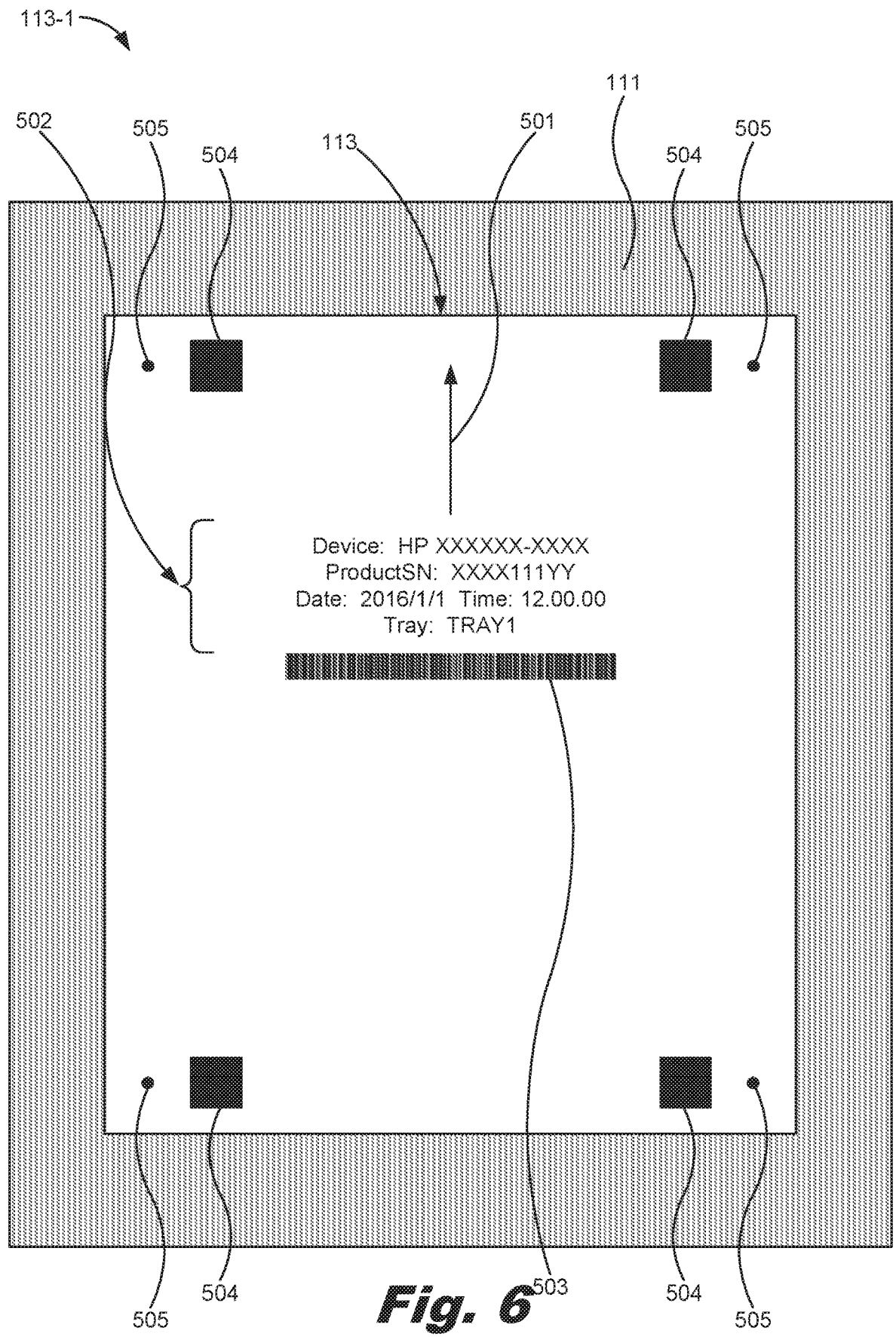
FIG. 6 is a diagram of a printed embodiment of the calibration target image of FIG. 5 within a scanning device, according to one example of the principles described herein.

FIG. 6 is a diagram of a printed embodiment of the calibration target image (113) of FIG. 5 within a scanning device (110) of the MFP device (100), according to one example of the principles described herein. As mentioned above, the scanning device (110) may include a background (111) that assists in the detection of a number of edges of the calibration target image (113) within a scanned calibration target image (113-1) including, for example, the leading edge or edge that is identified as the top of the calibration target image (113) and is a first edge scanned by the scanning device (110). The background (111) may also be helpful in detecting a number of side edges of the calibration target image (113), and, consequently, the centerline of the calibration target image (113). As used herein, the scanned calibration target image (113-1) is an electronic version of the calibration target image (113) as obtained from the scanning device (110) after the calibration target image (113) was printed on a print medium by the printing device (112).

The back ground (111) may include a repeating series of alternating darker tones and lighter tones perpendicular to a scan direction of the scanning device (110). In some examples the pattern will be a repeating array of vertical bars. The width of the bars or the spacing between bars may be dependent on the scanner resolution and/or the modulation transfer function (MTF) of the scanning device (110). In some examples the pattern will have a frequency of 50 cycles/inch. In one example, the darker tone will be a light tone and the lighter tone will be white. For example, the darker tone will have a LAB color space brightness equal to $L^*=88$ and the lighter tone will have a brightness equal to $L^*96$ with a tolerance of +/-1 to 3 L*s. In other examples, one or both of the two tones may be brighter or darker. In one example the tolerance for the brightness of the two tones is +/-1.5 L* units. The difference in brightness between the two tones, when measured in LAB color space is equal to delta ($\Delta$) $L^*=8$. In other examples $\Delta L^*$ may be larger or smaller.

In this example, the intensity (i.e., the brightness or $L^*$) of the background (111) relative to the horizontal axis or the direction across the scanned image changes as detected by the calibration engine (114) changes from a relatively high value to a relatively low value with respect to the lighter and darker portions of the background (111), respectively. The intensity values of the pixels in the calibration target image (113) and of the pixels in the background (111) vary due to noise in the scanned calibration target image (113-1). The standard deviation of the amplitude of the pixel intensity values in the two background (111) areas located on the side of scanned calibration target image (113-1) may be, for example 4.6. The standard deviation of the amplitude of the pixel intensity values in the scanned calibration target image (113-1) may be, of example, 4.09. This gives a signal to noise ratio between the intensity values of the background (111) and the intensity values of the calibration target image (113) of the scanned calibration target image (113-1) of 1.15 to 1. Because of the low signal to noise ratio, the scanned calibration target image (113-1) may be filtered. The scanned calibration target image (113-1) may be filtered in two directions using two different filters. The scanned calibration target image (113-1) may be filtered in the vertical direction (i.e., along the scan direction) using a low pass filter and across the width of the scanned calibration target image (113-1) using a match filter. The filtering will reduce the random variation in intensity due to scanner noise and will increase the variation in intensity due to the variation in tone levels in the background (111) of the scanned calibration target image (113-1).

After filtering, the variation of intensity values for the background (111) may be relatively higher and the variation in intensity values for the calibration target image (113) may be relatively lower. In one example, the edges of the calibration target image (113) are located using the sum of the absolute difference (SAD) from the mean value of a 6-pixel window along the width of the scan. The edges of the calibration target image (113) in each scan line are the location of the transition between a high intensity variance area and a low intensity variance area. In one example, the edges of the calibration target image (113) are located for each scan line in the image. In another example, the edges of objects are located every Nth scan line where N can equal an integer between 1 and 100 scan lines. Once the edge positions have been located, they may be used to determine the orientation or skew of the calibration target image (113) within the scanned calibration target image (113-1) as will be discussed in more detail below.

Figure 7:
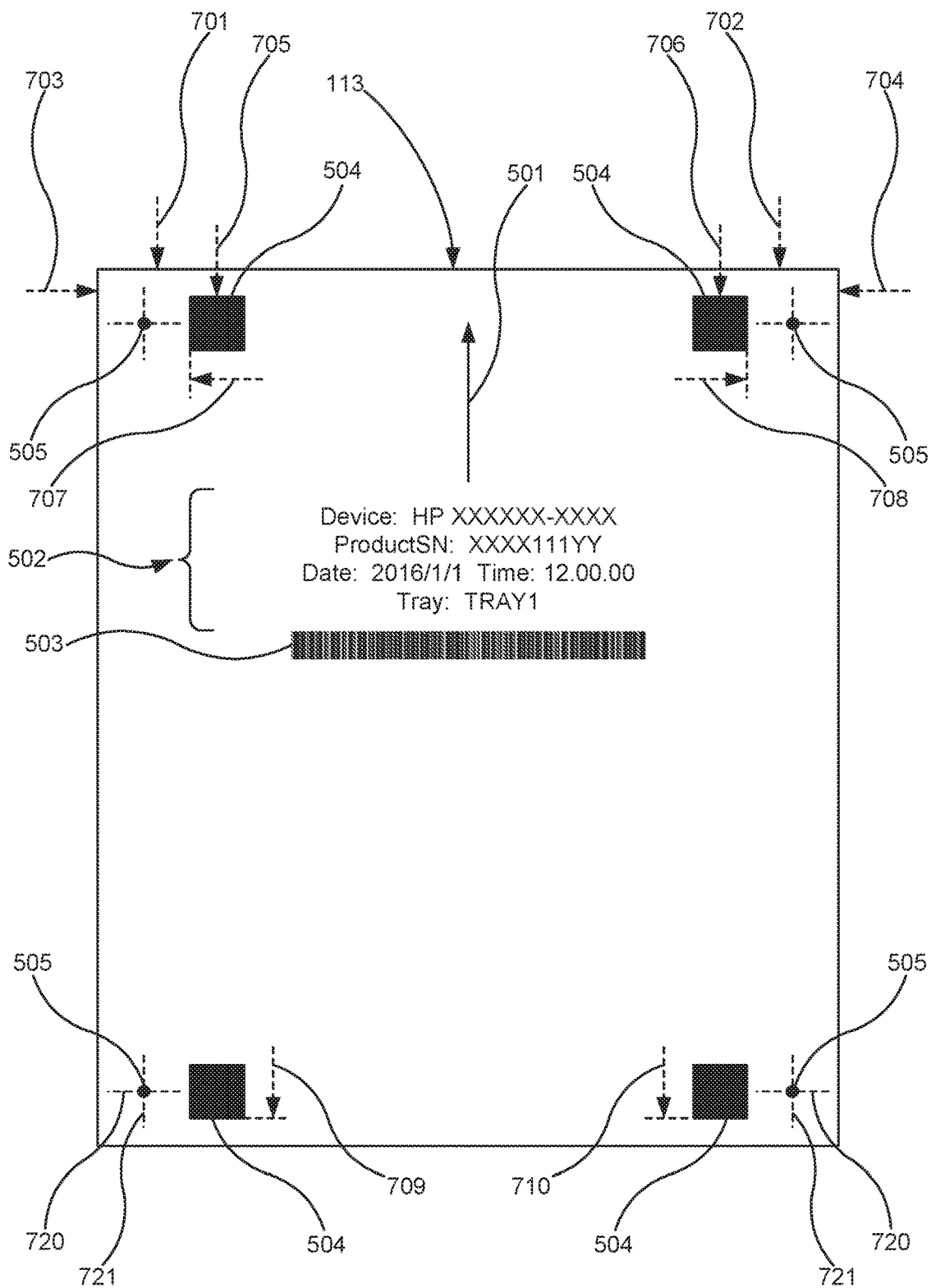
FIG. 7 is a diagram of the calibration target image of FIG. 6 as imaged by the scanning device, according to one example of the principles described herein.

FIG. 7 is a diagram of the calibration target image (113) of FIG. 6 as imaged by the scanning device (110), with a number of the edges of the calibration target image (113) determined, and as being analyzed by the MFP device (100), according to one example of the principles described herein. With the isolation of the calibration target image (113) from the background (111) of the scanned calibration target image (113-1), the fiducials (504, 505) may now be analyzed to determine their precise location and amount of skewing, misalignment, and mis-positioning as printed on the print medium (121-1, 121-2, 121-$n$). The leading edge and side edges of the calibration target image (113) were found in order to obtain and store in the data storage device (102) a number of scan position error values.

The scan position error values define errors associated with the manner in which the ADF (130) feeds print media past the scanning head of the scanning device (110) and/or how well the print media on the glass platen surface (110-1) is aligned with the scanning head. As to the ADF (130), the ADF may, like the various rollers within the printing device (112), cause the print media to be scanned to feed through the ADF (130) in a skewed, misaligned, and mis-positioned manner. As the rollers are used, they wear and may cause such distortions during operation. In one example, the ADF (130) may provide for duplex scanning either by inviting a user to mechanically turn the scanned page over and scanning the second side of the document. In another example, duplex scanning may be achieved through use of a second scan head in the ADF paper path that scans the second side of the document fed into the ADF. In still another example, duplex scanning may be achieved through use of a mechanical duplex ADF where the document is subjected to three passes due to flipping of the media by the ADF (130) from a first side to a second side to scan the second side, and performing one last flip in a similar manner to correct the order of the documents as output in an output tray of the ADF (130).

As to the glass platen surface (110-1), a user may be instructed to and appropriately align the print medium to be scanned with a number of alignment features associated with the glass platen surface (110-1). However, the scanning head of the scanning device (130) may not be properly aligned with the alignment features, and may be calibrated to account for the misalignment. Thus, skewing, misalignment, and mis-positioning may be present in connection with the use of the ADF (130) or the glass platen surface (110-1) of the scanning device (110), and calibration of both scanning systems may be performed as described above, and as will be described in more detail below.

In one example, the scan position error values stored in the data storage device (102) may be used to assist in the calibration of the printing device (112). The printing device (112) may, in some instances, print text and images on the print media incorrectly such that skewing, misalignment, and mis-positioning of the text and images as printed on the print medium may occur. The scan position errors may be accounted for when the calibration engine (114) determines the calibration target error values.

With reference again to FIG. 7, a number of calibration target regions are identified using a distance from the edges of the calibration target image (113). Distances in the calibration target image (113) may be measured in pixels, motor steps of a motor of the printing device (112) or the scanning device (110), and encoder count of the motor of the printing device (112) or the scanning device (110), other measurements of distances along the calibration target image (113), or combinations thereof. For ease of discussion, pixel values will be used in the below examples. In one example, the MFP device (100) may include a sensor in the paper path. The sensor may detect the leading edge or top of the print medium (121-1, 121-2, 121-n) to indicate to the MFP device (100) when to begin measuring distances via the pixels, motor steps, encoder counts, or other measurements.

The leading edge of the calibration target image (113) is defined by the pixel values at either arrows (701) or (702). Having determined the location of the leading edge using the background (111) of the scanning device (110), a skew associated with the scan position errors may be determined by subtracting the pixel value at (701) from the pixel value at (702). In one example, a positive value may indicate that the skew is in the clockwise direction, or, in other words, that the leading edge of the calibration target image at (702) is lower with respect to (701) and a horizontal axis.

The left and right edges as defined by arrows (703) and (704), respectively, of the calibration target image (113) are determined by assigning, for example, a pixel value of 0 for a left-most pixel. This pixel value defines the left edge at arrow (703). The right edge at arrow (704) may be assigned the highest pixel value, and the centerline of the calibration target image (113) is determined by ((704)–(703))/2. In this manner, the leading edge, right and left edges, and centerline of the calibration target image (113) is defined using pixel values.

The calibration target error values are determined using an analysis of the calibration target image (113) to determine the position of the fiducials (504, 505). The position of the fiducials (504) within the scanned and isolated image of the calibration target image (113) are determined using the calibration engine (114) to detect a change from white to black and black to white in order to find the side edges of the fiducials (504). The pixel values obtained at those locations define the left and right sides of the fiducials (504).

The leading edge of the fiducials (504), for example, may be determined by subtracting pixel values at (701) from pixel values at (705), and pixel values at (702) from pixel values at (706), respectively. A left edge of the fiducials (504), for example, may be determined by subtracting pixel values at (703) from pixel values at (707). The centerline of the calibration target image (113) may be determined by (((704)–(708))–((707)–(703)))/2.

Further, a stretch or shrinking of the calibration target image (113) as printed on the print medium (212-1, 212-2, 212-n) may occur. This stretching or shrinking of the image causes the image to look distorted along the length of the image as scanned by the scanning device (110). This stretching or shrinking may be determined by subtracting the pixel values at (705) from the pixel values at (709) or by subtracting the pixel values at (706) from the pixel values at (710). If either of these values are positive, this indicates that the image is stretched along the length of the scanned image. Conversely, a negative value indicates shrinkage.

The circular fiducials (505) may be located using similar techniques described above regarding the rectangular fiducials (504). The circular fiducials (505) are analyzed with respect to a scan line (720) in the X-axis and a motion line (721) in the Y-axis. The calibration target image (113) may include one of the two sets of fiducials (504, 505), both sets of fiducials (504, 505), or other types of fiducials in place of or in addition to the fiducials (504, 505) depicted in FIGS. 5 through 7.

Figure 8:
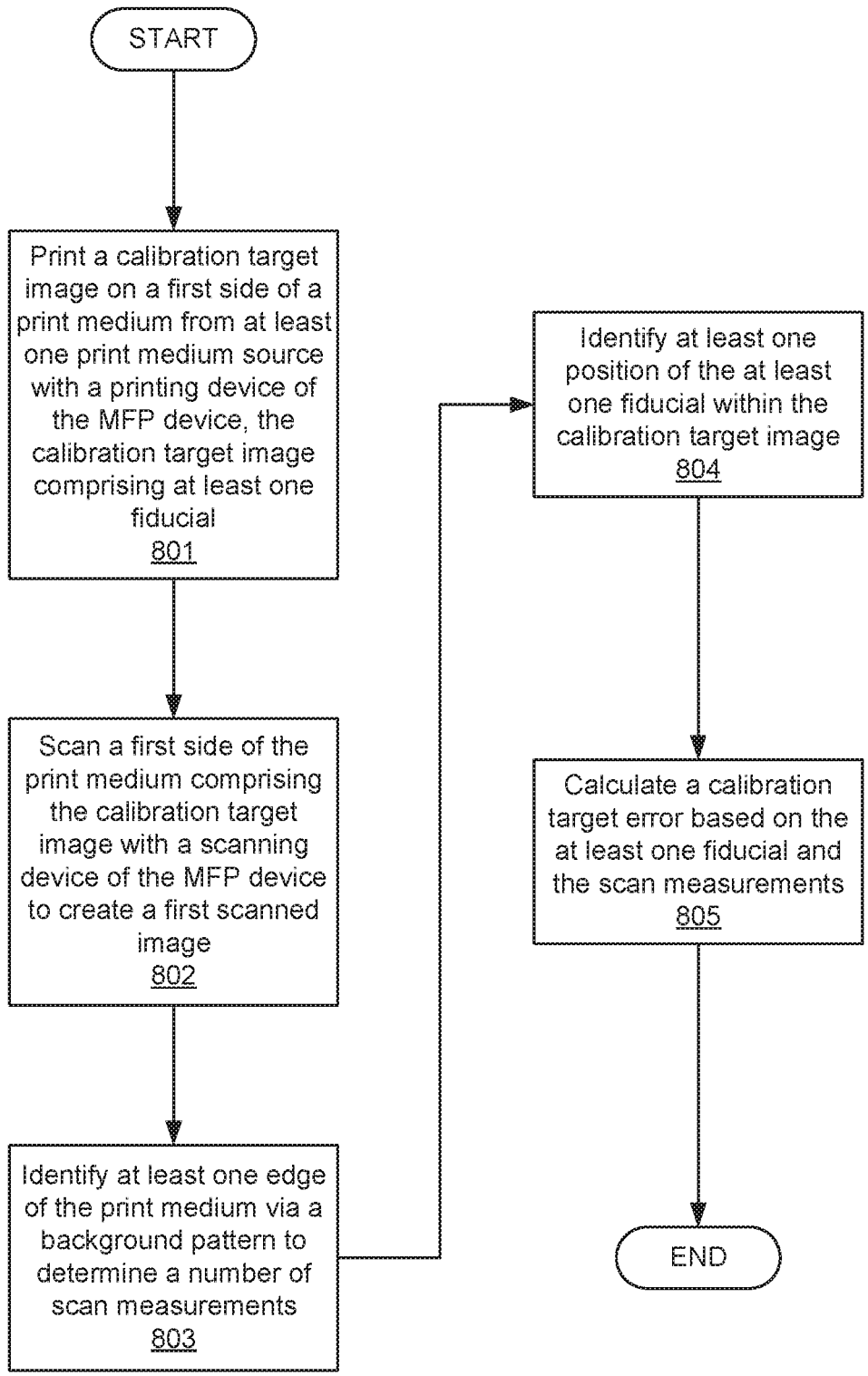
FIG. 8 is a flowchart depicting a method for calibrating an MFP device, according to one example of the principles described herein.

FIG. 8 is a flowchart depicting a method of calibrating an MFP device (100), according to one example of the principles described herein. The method of FIG. 8 may begin by printing (block 801) a calibration target image (113) on a first side of a print medium (121-1, 121-2, 121-n) from at least one print medium source (120-1, 120-2, 120-n) with a printing device (112) of the MFP device (100). The calibration target image (113) includes at least one fiducial (504, 505).

The method may continue with scanning (block 802) the first side of the print medium (121-1, 121-2, 121-n) including the calibration target image (113) with a scanning device (110) of the MFP device (100) to create a first scanned image. The calibration engine (114) may identify (block 803) at least one edge of the print medium (121-1, 121-2, 121-n) via a background pattern (111) to determine a number of scan measurements. The calibration engine (114) may identify (block 804) at least one position of the at least one fiducial (504, 505) within the calibration target image (113). The method may include calculating (block 805), with the calibration engine (114) a calibration target error based on the at least one fiducial (504, 505) and the scan measurements. In one example, the background pattern (111) includes a repeating series of alternating darker tones and lighter tones perpendicular to a scan direction of the scanning device.

In one example, the method may include storing the calibration target error in a memory device such as the data storage device (102). The calibration target error is associated in the data storage device (102) with an identification of a corresponding one of the at least one print medium source (120-1, 120-2, 120-n). In one example, the calibration target image (113) is generated by the MFP device (100) from a stored file in a memory device such as the data storage device (102) of the MFP device (100).

The method may include scanning a second side of the print medium (121-1, 121-2, 121-n) opposite the first side of the print medium with the scanning device (110) to create a second scanned image, and, based on the stored identified print media source (120-1, 120-2, 120-n) and calibration target error, identifying a number of scan position errors and calibration correction values for the scanned second side. In one example, the scan position errors and the calibration correction values may be stored in the data storage device (102) for the scanned second side in the memory device.

In one example, printing the calibration target image (113) includes requesting a user to calibrate the MFP device, and, in response to the user's selection of a number of calibration parameters, printing the calibration target image based on the calibration parameters. In one example, the calibration parameters include instructions to calibrate the printing device (112) of the MFP device (100); instructions to calibrate the scanning device (110) of the MFP device (100); instructions to use the at least one print medium source (120-1, 120-2, 120-n) as a source of the print medium (121-1, 121-2, 121-n), or combinations thereof. In one example, the at least one print medium source (120-1, 120-2, 120-n) includes a plurality of print medium sources (120-1, 120-2, 120-n) that include a plurality of different print media (121-1, 121-2, 121-n). In this example, the calibration target error is calculated for each of the different print media (121-1, 121-2, 121-n) within the plurality of print medium sources (120-1, 120-2, 120-n), respectively.

In one example, the calibration target image (113) includes calibration target image information (502). The calibration target image information (502) may include an orientation indicator (501) to indicate orientation of the print medium (121-1, 121-2, 121-n) including the calibration target image (113) within the scanning device (110); identification of the at least one print medium source (120-1, 120-2, 120-n); a number of dimensions of the print medium (121-1, 121-2, 121-n); an identification of the calibration target image (113) associated with the dimensions of the print medium (121-1, 121-2, 121-n); identification of the MFP device (110); a serial number of the MFP device (110); a date on which the calibration target image (113) is printed on the print medium (121-1, 121-2, 121-n); a time at which the calibration target image (113) is printed on the print medium (121-1, 121-2, 121-n), or combinations thereof. In one example, the calibration target image information (502) is defined using a barcode (503).

Figure 9:
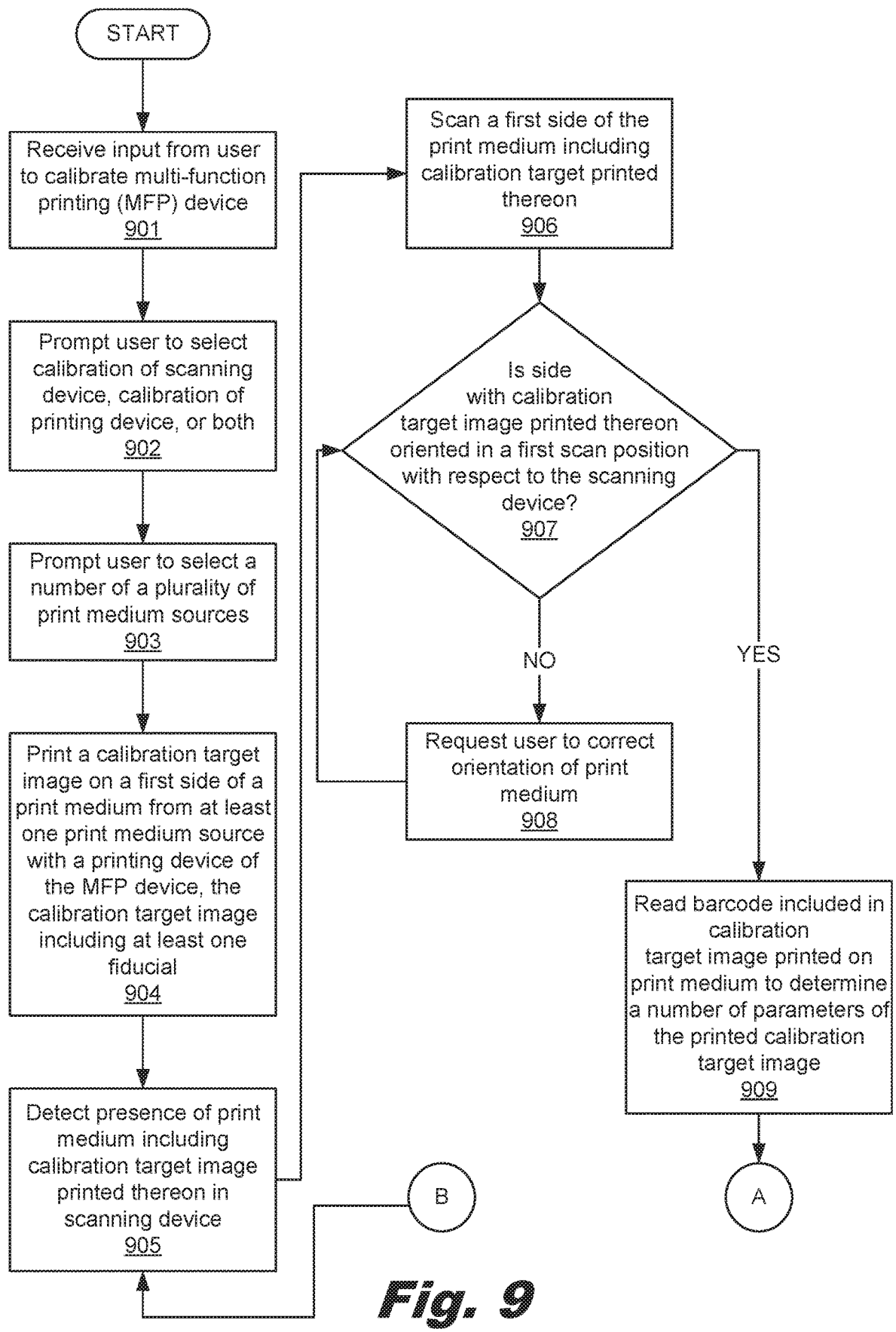
FIGS. 9 and 10 are a flowchart depicting a method for calibrating an MFP device, according to another example of the principles described herein.
Figure 10:
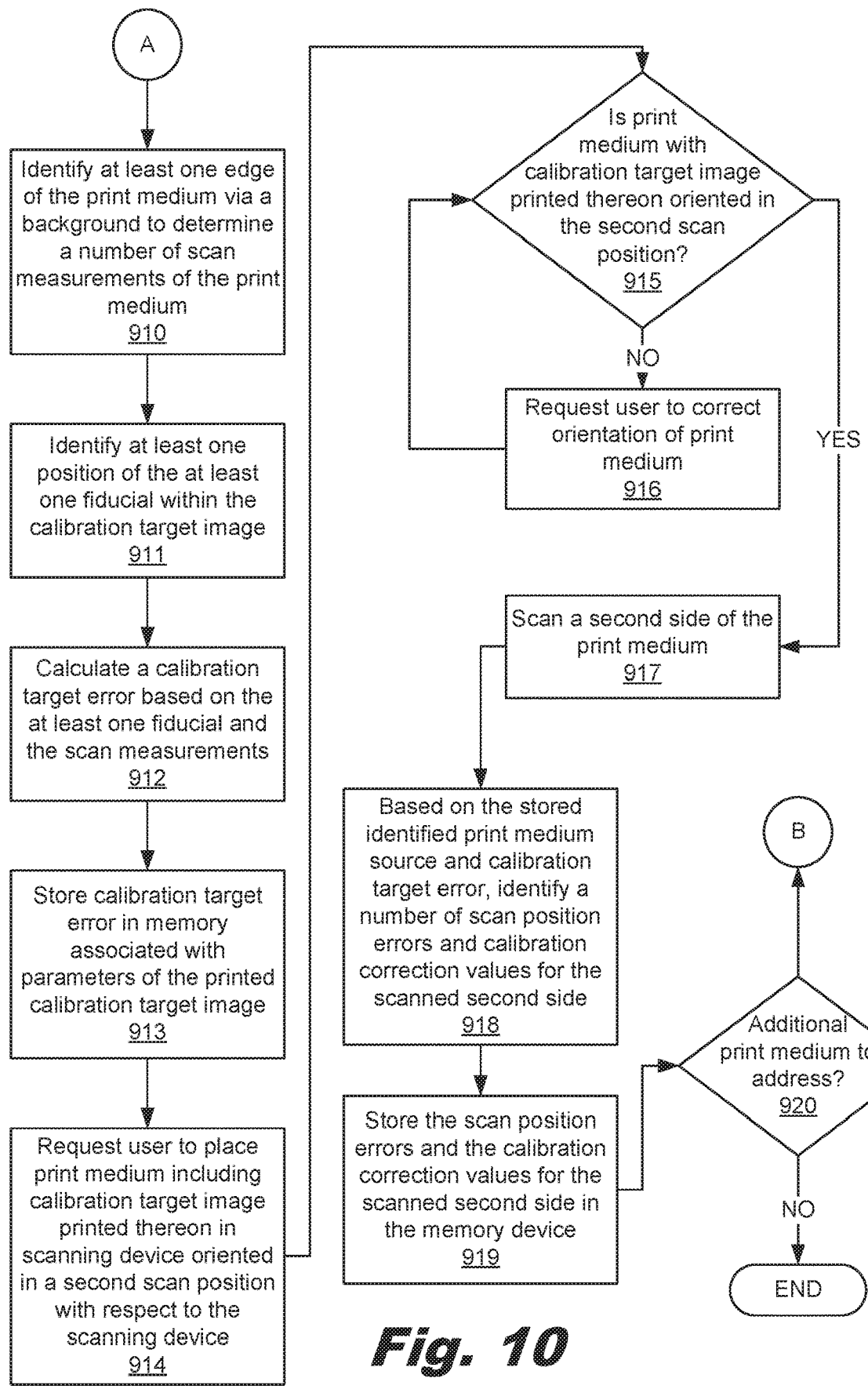

FIGS. 9 and 10 is a flowchart depicting a method of calibrating an MFP device, according to another example of the principles described herein, the method of FIGS. 9 and 10 may begin by receiving (block 901) input from a user to calibrate the MFP device (100). In one example, the receipt (block 901) of the instructions to calibrate may be made sua sponte by the user through the user possibly noticing a degradation in printing or scanning quality and desiring to perform a calibration of the MFP device (100). In another example, the receipt (block 901) of the instructions to calibrate may be as a result of the MFP device (100) performing a scheduled self-maintenance and prompting the user via the display device (109).

The MFP device (100), via the display (109), may prompt (block 902) the user to select the calibration of the scanning device (110), calibration of the printing device (112), or calibration of both the scanning device (110) and the printing device (112). Even though calibration of the scanning device (110) and printing device (112) are components described herein in connection with the calibration process, any number of components or sub-components of the MFP device (100) may be presented to and selected by the user as an option for calibration. For completeness in describing the entire method, the description of FIGS. 9 and 10 will be presented as if the user selected calibration of both the scanning device (110) and the printing device (112). Further, at block 902, the user may be prompted to select the calibration of the ADF (130) of the scanning device (110), the glass platen surface (110-1) of the scanning device, or both. For completeness in describing the method of FIGS. 9 and 10, the method will be described as if the user selected the calibration of both the ADF (130) and the glass platen surface (110-1) of the scanning device (110).

At block 903, the MFP device (100), via the display device (109), prompts the user to select a number of a plurality of print medium sources (120-1, 120-2, 120-n) from which the user wishes to calibrate. As mentioned above, since the print media (121-1, 121-2, 121-n) within each of the plurality of print medium sources (120-1, 120-2, 120-n) may be oriented differently and because the physical travel path of the print media (121-1, 121-2, 121-n) from the print medium sources (120-1, 120-2, 120-n) to a printer engine imaging section (112-1) where the text and images are printed on the print media (121-1, 121-2, 121-n) may be different and because the differently-sized print media (121-1, 121-2, 121-n) may be fed into the ADF (130) or placed on the glass platen surface (110-1) of the scanner in a different manner and/or in a different orientation, each of the print media (121-1, 121-2, 121-n) may be individually calibrated. As will be apparent from the description below, the first side of the print medium (121-1, 121-2, 121-n) including the calibration target image (113) is scanned using the ADF (130) before a second side of the print medium (121-1, 121-2, 121-n) not including the calibration target image (113) is scanned using either the ADF (130) or the glass platen surface (FIG. 4, 110-1). The individual calibration of the print media (121-1, 121-2, 121-n) and respective print medium sources (120-1, 120-2, 120-n) may be performed such that calibration data associated with each of the print media (121-1, 121-2, 121-n) and respective print medium sources (120-1, 120-2, 120-n) are individually stored in, for example, the data storage device (102). The calibration data for the print media (121-1, 121-2, 121-n) may be stored in a manner such that it is associated or identified as being from a respective print medium sources (120-1, 120-2, 120-n).

The method of FIGS. 9 and 10 may continue within printing (block 904) a calibration target image (113) on a first side of a print medium (121-1, 121-2, 121-n) from at least one print medium source (120-1, 120-2, 120-n) with the printing device (112) of the MFP device (100). The calibration target image (113) includes at least one fiducial (504, 505) as described above. The calibration target image (113) may be printed (block 904) on one print medium (121-1, 121-2, 121-n) or may be printed (block 904) on a plurality of print media (121-1, 121-2, 121-n) obtained from a respective number of print medium sources (120-1, 120-2, 120-n) based on the calibration parameters received from the user at block 903, thus, if the user requested calibration of a plurality of print media (121-1, 121-2, 121-n) and respective number of print medium sources (120-1, 120-2, 120-n), then a corresponding number of print media (121-1, 121-2, 121-n) will be printed and utilized throughout the method of FIGS. 9 and 10.

The user may then be instructed via, for example, the display device (109), to place the print media (121-1, 121-2, 121-n) with the calibration target images (113) printed thereon into the scanning device (110). For example, textual instructions, pictorial instructions, or both may be presented on the display device (109) to assist the user in determining the correct orientation of the print medium (121-1, 121-2, 121-n) within the ADF (130), glass platen surface (110-1), or both of the scanning device (110) based on the calibration parameters received from the user at block 902.

The method further includes detecting (block 905) the presence of the print medium (121-1, 121-2, 121-n) including the calibration target image (113) printed thereon in the scanning device (110). The first side of the print medium (121-1, 121-2, 121-n) including the calibration target image (113) printed thereon is scanned (block 906), and a determination (block 907) is made as to whether the side of the print medium (121-1, 121-2, 121-n) with the calibration target image (113) printed thereon is oriented in a first scan position with respect to the scanning device (110). The first scan position includes the print medium (121-1, 121-2, 121-n) being oriented in the scanning device (110) such that the calibration target image (113) printed thereon is oriented in the scanning device (110) for the scanning device (110) to image the calibration target image (113) in an intended orientation. The first scan position may also include a feed orientation as indicated by the orientation arrow (501).

If the side of the print medium (121-1, 121-2, 121-n) with the calibration target image (113) printed thereon is not oriented in the first scan position (block 907, determination NO), then the MFP device (100) requests (block 908) the user to correct the orientation of the print medium (121-1, 121-2, 121-n). The method loops back to block 907, where the method again determines (block 907) whether the side of the print medium (121-1, 121-2, 121-n) with the calibration target image (113) printed thereon is oriented in a first scan position with respect to the scanning device (110). This looping back to block 907 occurs as many times as until orientation is correct. Once the orientation is corrected at blocks 907 and 908, or if the orientation was correct from the outset (block 907, determination YES), the scanning (block 906) of the first side continues by reading (block 909) a barcode (503) included in the calibration target image (113) printed on print medium (121-1, 121-2, 121-n) to determine a number of parameters of the printed calibration target image (113). These parameters include, for example, textual information (502) printed as part of the calibration target image (113) and may be determined from the textual information (502) directly or by reading the bar code (503). As described above, the textual information (502) may include any information associated with the MFP device (100), any of its components or subcomponents, an identification of the MFP device (100), a serial number of the MFP device (100), and model number of the MFP device (100), a date and/or time the calibration target image (113) was printed by the MFP device (100), an identification of the print medium source (120-1, 120-2, 120-n) from which the print media (121-1, 121-2, 121-n) on which the calibration target image (113) is printed thereon originates, other useful information, or combinations thereof. This information is stored in, for example, the data storage device (102) as part of the calibration data, and will be associated with any calibration error data detected and stored.

The method may continue by following circle A to FIG. 10, and identifying (block 910) at least one edge of the print medium (121-1, 121-2, 121-n) via a background (111) to determine a number of scan measurements of the print medium (121-1, 121-2, 121-n). The scan measurements include identifying the leading edge and a number of the side edges as described above in connection with FIG. 6. At least one position of the at least one fiducial (504, 505) may be identified (block 911) within the calibration target image (113) as scanned and presented in an electronic copy.

The method may continue by calculating (block 912) a calibration target error based on the position of the at least one fiducial (504, 505) determined at block 911 and the scan measurements determined at block 910. The calibration target error is stored (block 913) in memory included in the data storage device (102), and is associated with the parameters of the printed calibration target image (113) determined at block 909). For each print medium (121-1, 121-2, 121-n) calibrated, the calibration target error is stored (block 913) with its respective parameters. This is done so that each print medium source (120-1, 120-2, 120-n) receives an individualized calibration, and data associated with that individualized calibration is stored and made available as print media (121-1, 121-2, 121-n) from that print medium source (120-1, 120-2, 120-n) is used in a printing job.

In order to fully calibrate the scanning device (110), the user may be requested (block 914), using, for example, the display device (109), to place the print medium (121-1, 121-2, 121-n) including the calibration target image (113) printed thereon in the scanning device (110) oriented in a second scan position relative to the first side of the print medium (121-1, 121-2, 121-n) determined at blocks 906 through 908. A determination (block 915) as to whether the print medium (121-1, 121-2, 121-n) with the calibration target image (113) printed thereon is oriented in the second scan position. For example, the second side of the print medium (121-1, 121-2, 121-n) may be on opposite side of the print medium (121-1, 121-2, 121-n) from the side of the print medium (121-1, 121-2, 121-n) on which the calibration target image (113) is printed. The orientation arrow (501) may also be used to instruct and assist the user in determine a proper feed orientation with the ADF (130) or proper orientation on the glass platen surface (110-1).

If the determination at block 915 is NO, then the MFP device (100) prompts or requests (block 916) the user to correct orientation of the print medium (121-1, 121-2, 121-n) to the second scan position. The method loops back to block 915, where the method again determines (block 915) whether the print medium (121-1, 121-2, 121-n) with the calibration target image (113) printed thereon is oriented in the second scan position. This looping back to block 9915 occurs as many times as until orientation is correct. Once the orientation is corrected at blocks 915 and 916, or if the orientation was correct from the outset (block 915, determination YES), the second side of the print medium (121-1, 121-2, 121-n) is scanned (block 917). Based on the stored identified print medium source and calibration target error data stored at block 913, a number of scan position errors and calibration correction values for the scanned second side of the print medium (121-1, 121-2, 121-n) are identified (block 918). The MFP device (100) stores (block 919) the scan position errors and the calibration correction values for the scanned second side in the data storage device (102) in association with its respective parameters and calibration target errors determined at blocks 910 through 912. The method is performed for as many print medium sources (120-1, 120-2, 120-n) as selected by the user at block 903 by determining (block 920) whether additional print media (121-1, 121-2, 121-n) are to be addressed. If no more print media (121-1, 121-2, 121-n) are to be addressed (block 920, determination NO), then the calibration process may end. If, however, additional print media (121-1, 121-2, 121-n) are to be addressed (block 920, determination YES), then the method may return to block 905 in FIG. 9 via circle B for analysis of the subsequent print media (121-1, 121-2, 121-n) according to the method described above.

Once the calibration target errors are obtained and stored, any subsequent printing jobs may use the calibration target errors to correct skewing, misalignment, and mis-positioning of text and images as printed on the print media (121-1, 121-2, 121-n) to obtain documents with properly positioned text and images printed thereon. In this manner, the printing device (112) is calibrated. Further, the calibration of the scanning device (110) is achieved Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (102) of the MFP device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe systems and methods of calibrating a printing device, a scanning device, and a number of print medium sources within an MFP device. This calibration system and method allows a user to print and generate an inexpensive calibration target from any of a plurality of print medium sources in the MFP and calibrate both a scanning device, but also remove printer image placement errors from the print medium sources. The calibration target image described herein very simple for the user to produce since the user does not have to refeed and orientate the printed calibration target image back into a tray of the print medium source for proper target formation on the page. The calibration target image also does not require toner to run off the printed calibration target image. This allows the calibration target image to be generated by a larger number of types of printing devices including, for example, laser and Ink based MFP devices (100), or other types of multi-function printing devices. The background provided as part of the scanning device allows for calibration of the scanning device as well.

Further, the user may also print a single calibration target image from any and all print medium sources to calibrate the entire MFP device (100). Thus, the present calibration system may be used to calibrate print medium sources that include A4, Letter-sized, and larger media formats such as 11×17-sized, ledger-sized and A3. Further, a long edge feed of an A3-sized print medium may be executed using the present calibration methods. Further, the present calibration systems and methods reduce waste in ink and print media by not requiring printing on both sides of the print media. The calibration system is user friendly such that the user no longer has to reload the print media back onto the print medium sources. Further, the present systems and methods are less expensive since they do rely on a third party printer engine for support in calibration.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for calibrating a multi-function printing (MFP) device comprising:
printing a calibration target image on a first side of a print medium from at least one print medium source with a printing device of the MFP device, the calibration target image comprising at least one fiducial;
scanning the first side of the print medium comprising the calibration target image with a scanner of the MFP device to create a first scanned image;
identifying at least one edge of the print medium via a background pattern of the scanner to determine a number of scan measurements;
identifying at least one position of the at least one fiducial within the calibration target image; and
calculating a calibration target error based on the at least one position of the at least one fiducial and the scan measurements.

2. The method of claim 1, further comprising storing the calibration target error in a memory, the calibration target error being associated in the memory device with an identification of a corresponding one of the at least one print medium source.

3. The method of claim 1, wherein the calibration target image is generated by the MFP device from a stored file in a memory of the MFP device.

4. The method of claim 2 further comprising:
scanning a second side of the print medium opposite the first side of the print medium with the scanner to create a second scanned image;
identifying a number of scan position errors and calibration correction values for the scanned second side based on the stored identified print media source and calibration target error; and
storing the scan position errors and the calibration correction values for the scanned second side in the memory.

5. The method of claim 1, wherein printing the calibration target image comprises:
requesting a user to calibrate the MFP device; and
in response to the user's selection of a number of calibration parameters, printing the calibration target image based on the calibration parameters, wherein the calibration parameters comprise instructions to calibrate the printing device of the MFP device; instructions to calibrate the scanner of the MFP device; and instructions to use the at least one print medium source as a source of the print medium, or combinations thereof.

6. The method of claim 1, wherein the calibration target image comprises calibration target image information, the calibration target image information comprising:
a marking on the print medium to indicate orientation of the print medium comprising the calibration target image within the scanner; identification of the at least one print medium source; a number of dimensions of the print medium; an identification of the calibration target image associated with the dimensions of the print medium; identification of the MFP device; a serial number of the MFP device; a date on which the calibration target image is printed on the print medium; a time at which the calibration target image is printed on the print medium, or combinations thereof.

7. The method of claim 6, wherein the calibration target image information is defined using a barcode.

8. The method of claim 1, wherein the background pattern of the scanner comprises a repeating series of alternating darker tones and lighter tones perpendicular to a scan direction of the scanner.

9. The method of claim 8, wherein identifying at least one edge of the print medium comprises filtering the first scanned image in the scan direction using a low-pass filter and filtering the first scan image in the direction perpendicular to the scan direction using a match filter, to increase tone level variation in portions of the first scanned image corresponding to the background pattern.

10. The method of claim 1, wherein the first scanned image comprises the calibration target image superimposed on the background pattern of the scanner.

11. The method of claim 1, wherein the calibration target error comprises error associated with the placement of the printed calibration target image on the first side of the print medium.

12. A method for calibrating a multi-function printing (MFP) device comprising:
printing a calibration target image on a first side of a print medium from at least two different print medium sources with a printing device of the MFP device, the calibration target image comprising at least one fiducial;
after the printing of the print medium from all the print medium sources is complete, scanning the first side of each print medium comprising the calibration target image with a scanner of the MFP device to create a first scanned image of that medium;
identifying, for each print medium, from the first scanned image at least one edge of the print medium via a background pattern to determine a number of scan measurements;
identifying, for each print medium, at least one position of the at least one fiducial within the calibration target image of the first scanned image; and
calculating a calibration target error for each print medium based on the at least one fiducial and the scan measurements for that print medium, the calibration target error associated with the corresponding print medium source.

13. A multi-function printing (MFP) device comprising:
a processor;
a non-transitory computer-readable medium coupled to the processor having processor-executable instructions and a calibration target image stored thereon;
a scanner;
a background of the scanner comprising a repeating series of alternating darker tones and lighter tones perpendicular to a scan direction of the scanner;
a printing device to print the calibration target image on a plurality of print media from a corresponding number of print medium sources; and
wherein the processor-executable instructions, when executed by the processor, cause the processor to calculate, for each of the plurality of print media, a calibration target error based on a number of fiducials within the calibration target image and a number of scan measurements defined by the background.

14. The MFP device of claim 13, wherein the processor-executable instructions, when executed, further cause the processor to:
identify a leading edge and a number of side edges of the print medium identified using the background to determine the number of scan measurements; and
store the calibration target error in the computer-readable medium, the calibration target error being associated in the computer-readable medium with an identification of the corresponding print medium source.

15. The MFP device of claim 13, wherein the computer-readable medium stores correlation data associating the number of print medium sources with a number of dimensions of the plurality of print media within the print medium sources, respectively.

16. A computer program product for calibrating a multi-function printing (MFP) device, the computer program product comprising:
a computer readable storage medium comprising computer usable program code embodied therewith, the computer usable program code to, when executed by a processor:
print a calibration target image on a first side of a print medium from at least one print medium source with a printing device of the MFP device, the calibration target image comprising at least one fiducial;
scan a first side of the print medium comprising the calibration target image with a scanner of the MFP device to create a first scanned image;
identify a leading edge and a number of side edges of the print medium via a background pattern of the scanner to determine a number of scan measurements;
identify at least one position of the at least one fiducial within the calibration target image;
calculate a calibration target error based on the at least one fiducial and the scan measurements.

17. The computer program product of claim 16, further comprising computer usable program code to, when executed by a processor,
store the calibration target error in a memory, the calibration target error being associated in the memory with an identification of a corresponding one of the at least one print medium source;
scan a second side of the print medium opposite the first side of the print medium with the scanner to create a second scanned image;
identify a number of scan position errors and calibration correction values for the scanned second side based on the stored identified print media source and calibration target error;

store the scan position errors and the calibration correction values for the scanned second side in the memory; and print a number of documents based on the calibration correction values to correct placement of printed images on the print medium;

wherein the background pattern comprises a repeating series of alternating darker tones and lighter tones perpendicular to a scan direction of the scanner.

18. The computer program product of claim 16, wherein the calibration target image is generated by the MFP device from a stored file in a memory device of the MFP device.

\* \* \* \* \*